United States Patent
Nelson et al.

(10) Patent No.: US 9,482,179 B2
(45) Date of Patent: Nov. 1, 2016

(54) CYLINDER HEAD GASKETS WITH PUSH-ROD EYELETS

(71) Applicant: Federal-Mogul Corporation, Southfield, MI (US)

(72) Inventors: Nicholas Nelson, Round Lake, IL (US); Wilford Dean Virgin, Spring Grove, IL (US); Steven Kueltzo, Aurora, IL (US); Richard Larson, Des Plaines, IL (US); John Stark, Hanover Park, IL (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/331,972

(22) Filed: Jul. 15, 2014

(65) Prior Publication Data
US 2015/0014942 A1    Jan. 15, 2015

Related U.S. Application Data

(60) Provisional application No. 61/846,534, filed on Jul. 15, 2013.

(51) Int. Cl.
*F16J 15/08* (2006.01)
*F02F 11/00* (2006.01)

(52) U.S. Cl.
CPC .......... *F02F 11/002* (2013.01); *F16J 15/0825* (2013.01); *F16J 2015/0837* (2013.01); *F16J 2015/0862* (2013.01)

(58) Field of Classification Search
CPC ............................. F16J 15/0818; F16J 15/061
USPC .......................... 277/591, 598, 594, 595, 596
See application file for complete search history.

(56) References Cited

U.S. PATENT DOCUMENTS

| 1,928,585 | A | * | 9/1933 | Balfe ............................ 277/598 |
|---|---|---|---|---|
| 2,679,241 | A | | 5/1954 | Dickson |
| 3,086,507 | A | | 4/1963 | Mooney, Jr. |
| 4,049,856 | A | * | 9/1977 | Adams ......................... 428/131 |
| 4,535,999 | A | * | 8/1985 | Locacius ............... F16J 15/123 277/596 |
| 4,754,982 | A | * | 7/1988 | Udagawa et al. ........... 277/596 |
| 4,765,633 | A | * | 8/1988 | Hossack ...................... 277/600 |
| 5,082,298 | A | * | 1/1992 | Uchida et al. ............... 277/595 |
| 5,149,110 | A | * | 9/1992 | Inamura ...................... 277/595 |

(Continued)

FOREIGN PATENT DOCUMENTS

WO    9504217 A1    2/1995

OTHER PUBLICATIONS

International Search Report, mailed Jan. 15, 2015 (PCT/US2014/046663).

*Primary Examiner* — Kristina Fulton
*Assistant Examiner* — L. Susmitha Koneru
(74) *Attorney, Agent, or Firm* — Robert L. Stearns; Dickinson Wright, PLLC

(57) ABSTRACT

A multi-layer cylinder head gasket is provided. The cylinder head gasket includes a plurality of layers of material, each of the layers has a plurality of openings including at least one cylinder bore opening and at least one pushrod opening. Each of the layers has an edge which surrounds the at least one pushrod opening, and the pushrod openings of the layers are aligned axially with one another. An eyelet extends axially in each of the pushrod openings and covers the edges of the layers for protecting a pushrod extending through the respective pushrod opening. The eyelet is made of a material that is softer than the material of the plurality of layers.

11 Claims, 2 Drawing Sheets

(56) References Cited

U.S. PATENT DOCUMENTS

| | | | |
|---|---|---|---|
| 5,280,929 A * | 1/1994 | Miyaoh et al. | 277/595 |
| 5,482,298 A * | 1/1996 | Udagawa | 277/600 |
| 5,975,539 A * | 11/1999 | Ueda et al. | 277/593 |
| 6,036,195 A | 3/2000 | Udagawa | |
| 6,089,573 A * | 7/2000 | Udagawa | 277/593 |
| 6,237,557 B1 | 5/2001 | Wiegert | |
| 6,565,099 B1 * | 5/2003 | Ottinger et al. | 277/608 |
| 6,883,483 B1 | 4/2005 | Knudsen et al. | |
| 6,962,349 B2 * | 11/2005 | Notter et al. | 277/608 |
| 2005/0132998 A1 | 6/2005 | Gorgas et al. | |
| 2008/0277883 A1 * | 11/2008 | Hager et al. | 277/598 |

* cited by examiner

CYLINDER HEAD GASKETS WITH PUSH-ROD EYELETS

CROSS-REFERENCE TO RELATED APPLICATIONS

This application claims the benefit of application Ser. No. 61/846,534, filed Jul. 15, 2013, the disclosure of which is incorporated herein by reference.

BACKGROUND OF THE INVENTION

1. Field of the Invention

The present invention relates to cylinder head gaskets and more particularly to pushrod openings in such gaskets.

2. Related Art

Cylinder head gaskets are positioned between the engine block and the cylinder heads in an internal combustion engine. These gaskets seal around a plurality of cylinders in the engine block to ensure maximum compression and avoid leakage of coolant and engine oil into the cylinders. Such gaskets have openings for each of the cylinders as well as openings for accommodating the flow of engine coolant and engine oil between the engine block and the cylinder head. In many cases, cylinder head gaskets also have openings for the pushrods which are used to operate the valves in the cylinder heads.

Cylinder head gaskets today typically are formed by stacking multiple layers of steel on top of one another. The layers are held together in various ways, such as by welding, riveting or crimping.

The openings in many cylinder head gaskets are typically formed by a blanking process. This process typically provides openings with sharp edges, which may cause damage to the pushrods, either during assembly or during use.

SUMMARY OF THE INVENTION AND ADVANTAGES

The present invention provides an improved method and system for minimizing or preventing damage to pushrods and for stabilizing pushrods during assembly for an internal combustion engine. The invention provides an improved way to protect pushrods from the sharp edges of the pushrod openings in a multi-layer steel gasket. An eyelet is provided in each of the pushrod openings. The eyelets are made from a formable material which is capable of withstanding the engine environment and which can stay attached or secured to the steel gasket layers. As formed, the eyelets have smooth rounded edges and extend axially preferably sufficient to cover all of the gasket layers.

The invention prevents damage and wear to the pushrods, while still locating them properly in the gasket openings. The eyelets are preferably made of brass, copper, or a formable steel. The eyelets could also be made of plastic, rubber, elastomeric material, or other durable materials. The eyelets also can assist in keeping the layers of the gasket held rigidly together. Preferably, the eyelet material is softer (less hard) than the steel material forming the gasket and the pushrods.

Alternate embodiments include using one of the layers of the gasket to be incorporated into an eyelet and be folded over one or more of the other layers. The folded over portions create radiused edges that can guide the pushrod for assembly, support the pushrods during use, and also keep the gasket layers combined and rigid.

BRIEF DESCRIPTION OF THE DRAWINGS

These and other features and advantages of the present invention will be readily appreciated, as the same becomes better understood by reference to the following detailed description when considered in connection with the accompanying drawings, wherein.

DESCRIPTION OF THE PREFERRED EMBODIMENTS

Figure 1:
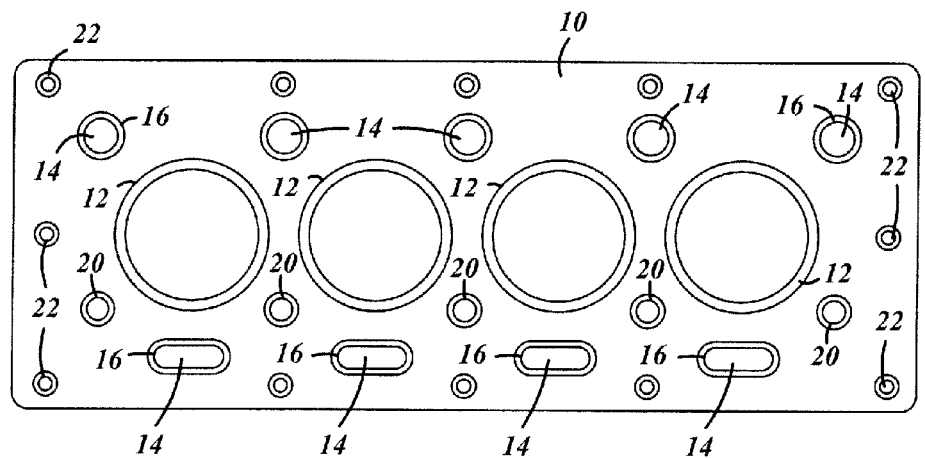
FIG. 1 depicts an exemplary gasket member.

Referring to the drawings, wherein like numerals indicate corresponding parts throughout the several views, FIG. 1 is a plan view of a representative cylinder head gasket 10. It is to be understood that the type, shape, configuration and components of the gasket 10 are exemplary and are used solely for purposes of describing the pushrod opening eyelet invention. The present invention for protecting and supporting the pushrods which are assembled and positioned in openings in a gasket member can be utilized with any suitable gasket member and is not limited to cylinder head gaskets or the particular embodiments shown and described herein.

The gasket member 10 has a plurality of openings 12 for mating with the cylinder bores in an engine. The gasket member 10 also has a number of openings 14 for passage of a fluid such as engine coolant, oil, water, or the like. Each of the openings 14 also has a sealing member 16 positioned around it to prevent leaks. Typically, the sealing members 16 are made of an elastomeric sealing material and are molded and/or bonded directly to the surfaces of the gasket member 10.

The gasket member 10 also has a plurality of pushrod openings 20 for positioning of the pushrods which operate the valves in the combustion chambers (not shown). In addition, a plurality of openings 22 are provided which used for fasteners, such as bolts in order to fasten the cylinder head (not shown) to the engine block (not shown). When the gasket member 10 is assembled in its final position between a cylinder head and an engine block, bolts or other fasteners are positioned through corresponding openings in the two engine components to secure the components tightly together.

Figure 2:
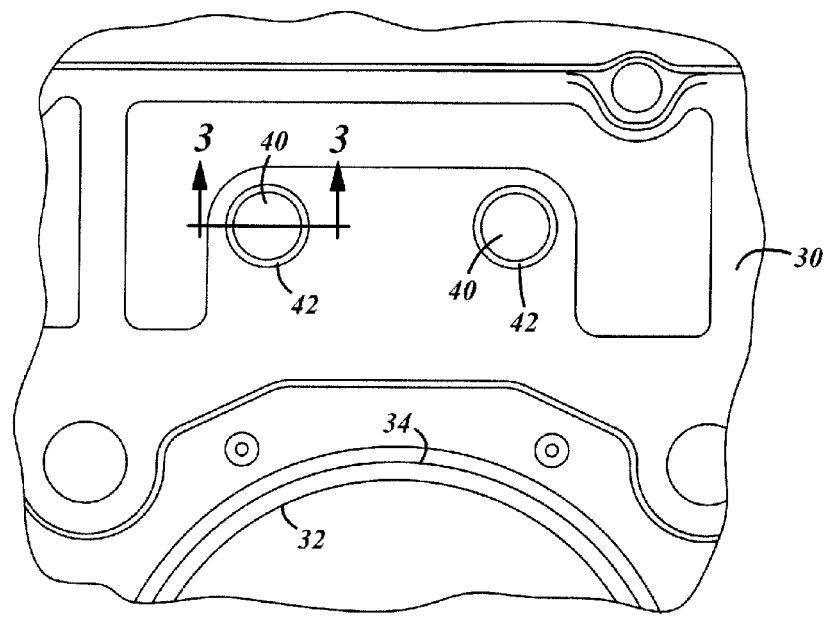
FIG. 2 is an enlarged fragmentary view of a portion of an exemplary gasket member.

An enlarged position of another exemplary gasket member 30 is shown in FIG. 2. This portion shows cylinder bore 32, a cylinder bore sealing member 34, and a pair of pushrod openings 40. Each of the pushrod openings 40 has an eyelet 42 positioned in it.

Figure 3:
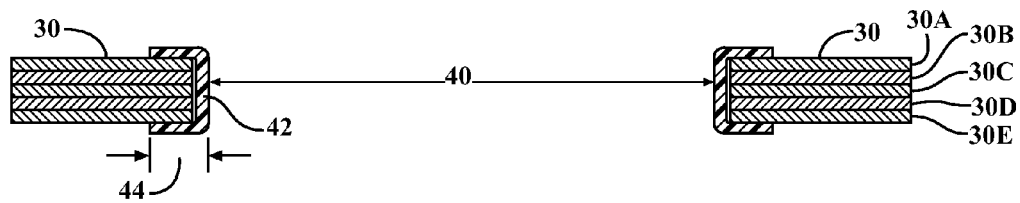
FIG. 3 is a cross-sectional view along line 3-3 of FIG. 2 and illustrates an embodiment of the invention.

FIG. 3 is a cross-sectional view taken along 3-3 in FIG. 2 and depicts the pushrod openings 40 and an eyelet 42. As shown in FIG. 3, the gasket member 30 is a multi-layer gasket member 30 which includes a plurality of layers of steel sheet members. In the embodiment shown in FIG. 3, the gasket member 30 has five layers, referenced as 30A, 30B, 30C, 30D and 30E. It is to be understood that in accordance with the invention, the gasket member 30 can have any suitable number of layers, such as 1, 3, 5 or more. The layers 30A-E of the multi-layer gasket member 30 may supplementally be held together in any other conventional manner, such as by welding, riveting, or crimping. The pushrod openings 40 of the layers 30A-E are aligned axially with one another.

Referring still to FIG. 3, in the exemplary gasket member 30, an eyelet member 42 is positioned in each of the pushrod openings 40. Since the edges of the openings in the steel layers 30A-E often are sharp, the eyelet member 42 protects the pushrods (not shown) from damage—both when the pushrods are being assembled in the engine and when the pushrods are reciprocating in the opening during use.

The eyelet members 42 are made of a material that is formed around the pushrod openings. The material can be soft like brass, copper, or any formable steel material (such as stainless steel). The eyelets also can be made of any plastic, rubber or elastomeric material which is sufficiently durable and compatible with the engine fluids in order to be used satisfactory for this purpose. Preferably, the eyelet members 42 are made of a material which is not as hard as the material used to make the pushrods, which typically is a steel material. The relatively softer eyelet material may prevent scratching, nicks, and other damage to the pushrods.

The eyelet members 42 can be formed and permanently positioned and affixed in the pushrod openings in any conventional manner. Typically, they can be formed or pressed into the shapes as shown in FIG. 3 wherein the eyelet members 42 extend axially between opposite ends which are flared radially outwardly. Also, preferably the eyelet members 42 will extend the full axial length of the pushrod openings and then extend a sufficient distance, such as indicated with the numeral 44, on the upper and lower surfaces of the gasket member (as shown in FIG. 3). The eyelet members 42 provide a guide for the pushrods during assembly and use, and do not damage the pushrods in any manner. The eyelet members 42 also protect the pushrods from the sharp edges of the openings in the multiple layers 30A-E of the gasket member 30. The eyelet members 42 also assist in holding the multiple layers 30A-E of the gasket member 30 tightly together. As such, the eyelet members 42 keep the gasket layers combined and rigid.

Figure 4:
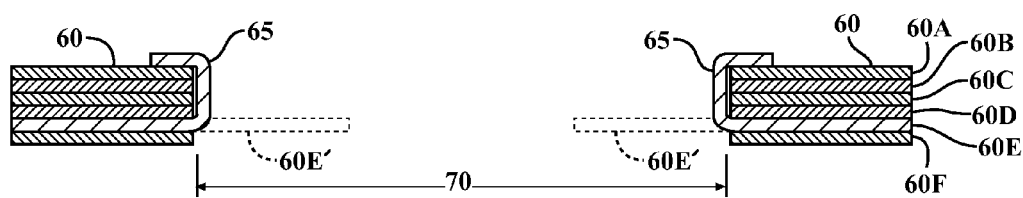
FIG. 4 shows a cross-sectional view of an alternate embodiment of the present invention.
Figure 5:
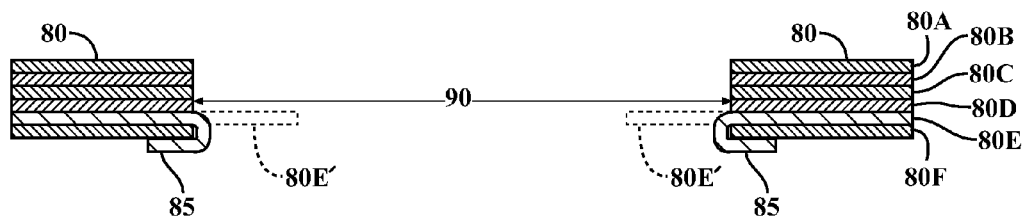
FIG. 5 shows a cross-sectional view of yet another alternate embodiment of the present invention.

FIGS. 4 and 5 depict alternate embodiments of the present invention. In these embodiments, one or more layers of the multi-layered gasket are folded over one or more of the other layers to create an eyelet with a radiused edge. This creates an eyelet in the opening without the use of a separate piece of material.

In FIG. 4, the multilayer gasket 60 has six layers 60A, 60B, 60C, 60D, 60E, and 60F. The layers are held together in a customary manner. An eyelet opening 70 is formed in all of the layers except one, which in this example is layer 60E. In layer 60E, an opening is not formed initially. Once all of the layers 60A-60F are combined and secured together, the portion 60E' of the layer 60E in the opening 70 is deformed by one or more forming steps into an edge protector 65. The edge protector 65 acts in the same manner as the eyelet member 42 as shown and described above with reference to FIG. 3. The edge protector 65 maintains the pushrod in the center of the pushrod opening and protects the pushrod if it moves into a position where it could come into contact with the sharp edges of the other layers 60A, 60B, 60C, 60D, and 60F. The edge protector 65 also adequately protects the pushrods during assembly when the pushrods are manually positioned in the openings.

The embodiment of the invention shown in FIG. 5 is similar to the FIG. 4 embodiment, but bends and forms a protruding gasket layer in an opposite direction and does not offer the same degree of protection for the pushrods. As shown, the multilayer gasket 80 has six layers, 80A, 80B, 80C, 80D, 80E, and 80F. Layer 80E initially protrudes (at 80E') into the pushrod opening 90 and then is formed into the protective edge 85. The protective edge 85 maintains the pushrod in the center of the opening 90 and protects the pushrod from making contact with the inside edges of layers 80A-80D and 80F.

For the embodiment shown in FIG. 4, as well as the embodiment shown in FIG. 5, it is preferred, but not required, that layers 60E' and 80E' are made from a material which is softer and less hard than the pushrods. This material could be brass, copper, or cold rolled steel, or any other material which is sufficiently durable and sufficiently strong to be part of a multi-layered gasket.

Obviously, many modifications and variations of the present invention are possible in light of the above teachings and may be practiced otherwise than as specifically described while within the scope of the appended claims.

What is claimed is:

1. A multi-layer cylinder head gasket comprising:
   a plurality of metal layers in a stacking relationship with one another and presenting at least one set of aligned first openings for a cylinder and at least one set of aligned second openings for fluid flow and at least one set of aligned third openings for a pushrod that is made of a pushrod material; and
   an eyelet extending axially between opposite ends which are flared radially outwardly, said eyelet being positioned in said at least one set of aligned third openings of said stacked metal layers, and said eyelet being made from a formable material which is softer than the pushrod material for protecting the pushrod if contact occurs between said eyelet and the pushrod and which is softer than the material of the metal layers;
   wherein said formable material of said eyelet is a metal; and
   wherein at least one of the radially outwardly flared ends overlies an uppermost layer of said stacked metal layers or underlies a lowermost layer of said stacked metal layers.

2. The multi-layer cylinder head gasket as described in claim 1 wherein said metal of said eyelet material is provided from the group comprising brass, copper, and formable steel.

3. The multi-layer cylinder head gasket as described in claim 1 wherein said layers of material forming said multi-layer gasket are made of a steel material.

4. A multi-layer cylinder head gasket comprising:
   a plurality of first layers of a first metal forming the gasket, said first layers being in a stacked relationship with one another and having a plurality of sets of aligned openings with at least one of said sets of aligned openings being a set of pushrod openings;
   a second layer of a second metal formed as part of the gasket and being stacked with said plurality of first layers, said second layer initially not having any pushrod openings, and said second metal of said second layer being softer than said first metal of said plurality of first layers;
   said second metal in said second layer being bent into an eyelet in each of said sets of pushrod openings in said first layers and with said eyelet extending axially between opposite ends which are flared radially outwardly to prevent contact between pushrods extending through said pushrod openings and said first layers; and wherein at least one of said radially outwardly flared ends of said eyelet overlies an uppermost of said stacked metal first layers or underlies a lowermost of said stacked metal first layers.

5. The multi-layer cylinder head gasket as described in claim 4 wherein the first layers are made of a steel material and said second layer is made of a second material which is formable and softer than the pushrod material.

6. The multi-layer cylinder head gasket as described in claim 5 wherein said second material is made from the group comprising brass, copper and formable steel.

7. A multi-layer cylinder head gasket, comprising:
a plurality of layers of metal and in a stacking relationship with one another, said stacked metal layers having a plurality of aligned sets of openings including at least one set of cylinder bore openings and at least one set of pushrod openings, and each of said stacked metal layers having an edge surrounding said at least one set of pushrod openings;
an eyelet extending axially in said set of pushrod openings between opposite ends which are flared radially outwardly to cover said edges of each of said stacked metal layers;
said eyelet being made of a metal that is softer than the metal of said plurality of layers; and
wherein one of said radially outwardly flared ends of said eyelet overlies an uppermost of said plurality of stacked metal layers or underlies a lowermost of said plurality of stacked metal layers.

8. The multi-layer cylinder head gasket as set forth in claim 7 wherein said eyelet is made of brass, copper, or a formable steel.

9. The multi-layer cylinder head gasket as set forth in claim 8 wherein said layers are made of steel.

10. The multi-layer cylinder head gasket as set forth in claim 1 wherein one of said radially outwardly flared ends of said eyelet overlies said uppermost layer and wherein the other of said radially outwardly flared ends of said eyelet underlies said lowermost layer.

11. The multi-layer cylinder head gasket as set forth in claim 7 wherein one of said radially outwardly flared ends of said eyelet overlies said uppermost layer and wherein the other of said radially outwardly flared ends of said eyelet underlies said lowermost layer.

\* \* \* \* \*